United States Patent [19]

Courtney et al.

[11] Patent Number: 4,867,524

[45] Date of Patent: Sep. 19, 1989

[54] METALLIC BOND FOR MOUNTING OF OPTICAL FIBERS TO INTEGRATED OPTICAL CHIPS

[75] Inventors: Daniel P. Courtney, Wilbraham; Timothy J. Bailey, Longmeadow, both of Mass.

[73] Assignee: United Technologies Corporation, Hartford, Conn.

[21] Appl. No.: 241,738

[22] Filed: Sep. 8, 1988

[51] Int. Cl.[4] .............................................. G02B 6/36
[52] U.S. Cl. ............................ 350/96.20; 350/96.15; 350/96.11
[58] Field of Search ............ 350/96.10, 96.11, 96.15, 350/96.16, 96.17, 96.20; 250/227, 552; 357/17, 19, 30, 74, 80

[56] References Cited

U.S. PATENT DOCUMENTS

| 4,445,751 | 5/1984 | Divens et al. ............... 350/96.15 X |
| 4,523,802 | 6/1985 | Sakaguchi et al. ........... 350/96.20 X |
| 4,750,800 | 6/1988 | Fournier et al. ............. 350/96.11 |
| 4,796,975 | 1/1989 | Lukas et al. ................. 350/96.20 X |
| 4,798,439 | 1/1989 | Preston ....................... 350/96.20 |
| 4,802,727 | 2/1989 | Stanley ....................... 350/96.20 |

Primary Examiner—John D. Lee
Assistant Examiner—Phan T. Heartney
Attorney, Agent, or Firm—Francis J. Maguire, Jr.; Charles E. Sohl

[57] ABSTRACT

A method for pigtailing an optical fiber to a lithium niobate integrated optical device (I/O chip) is shown and described wherein the bonding between the I/O chip and the optical fiber is a metallic bond. The lithium niobate may be attached to a metallic substrate which is welded to a metallic fiber optic carrier which is in turn welded to a metallized optical fiber. The fiber optic carrier may also be made of non-metallic materials which are given a metallic coating prior to attachment to the I/O chip by means of a metallic bond such as welding.

28 Claims, 1 Drawing Sheet

METALLIC BOND FOR MOUNTING OF OPTICAL FIBERS TO INTEGRATED OPTICAL CHIPS

TECHNICAL FIELD

This invention relates to mounting of optical fibers to integrated optical devices (I/O chips).

BACKGROUND ART

Typically, I/O chips are made of lithium niobate (LiNbO$_3$) or lithium tantalate (LiTO$_3$). These I/O chips are used in optical systems including optical interferometers utilizing optical wave guides. The I/O chips can be either of a single type including transducers, filters, modulators, memory elements, and others or of several functional applications combined onto a single device.

Typically, suppliers of lithium niobate crystals furnish pieces that are commonly in the form of thin slabs. These thin slabs may be designated X-cut, Y-cut or Z-cut referring, respectively, to the X, Y or Z axes being normal to the broad face of the slab. Thus, an "X-cut, Y-propagation" describes a device having the X-axis normal to the broad face and the Y-axis in the direction in which light propagates within the wave guide.

Lithium niobate has found widespread application in laboratory and experimental systems. However, in order to make practical use of lithium niobate as an integrated optic device, numerous material problems still require solutions. One such problem is that lithium niobate devices still require a coupling device between themselves and optical fibers which will function over a wide range of environments (i.e., shock, vibration and temperature). This inability to develop an environmentally stable coupling device stems from lithium niobate's strong anisotropic thermal expansion properties and from movement between the waveguide and the optical fiber. A strong anisotropic thermal expansion property means that the dimensional changes in the material associated with a temperature change differs in different directions in the crystal. Lithium niobate exhibits a thermal expansion property along the Z-axis (the Z-axis being defined as the axis about which the crystal exhibits three-fold rotation symmetry) in the range between $2 \times 10^{-6}$ per degree Centigrade to $7.5 \times 10^{-6}$ per degree Centigrade (note: the variations being due to the various investigators' use of different materials, measurement techniques and over different temperature ranges), while the thermal expansion in the isotropic X or Y axes are in the range between $14 \times 10^{-6}$ per degree Centigrade to $17 \times 10^{-6}$ per degree Centigrade. Military applications require the integrated optic device to survive temperature fluctuations between $-40°$ C. to $+80°$ C. Movement between the optical fiber and the waveguide occurs primarily because of the environment in which the integrated optic device is used along with the anisotropic thermal expansion property of lithium niobate. In a gyroscope system, for example, the integrated optical device will have one degree of freedom which will sustain a substantial amount of the shock occurring along that axis while all three axes will undergo vibration. Since the light wavelength in many state-of-the-art applications is at the 850 nanometer range, the outside maximum allowable movement between the wave guide core with respect the optical fiber core or vice versa is on the order of tenths of microns. Any movement beyond this narrow tolerance usually causes unacceptable distortion to the output signal.

Optical fibers coupled to I/O devices made of lithium niobate are well known in the art. Generally these devices are large, complex and are sensitive to shock and vibration forces. An I/O chip bonded to a substrate and coupled to an optical fiber is disclosed in U.S. Pat. No. 4,750,800 and assigned to the same assignee as this application. The point of novelty of that patent lies in the selection of the substrate material and in the mounting orientation of the I/O chip to the substrate. The substrate material is chosen from materials having anisotropic thermal expansion characteristics similar to those of the I/O chip. That patent discloses the use of a fiber carrier in combination with the I/O chip and the fiber optic conductor. It is also known in the prior art to invert an integrated optical device (I/O chip) on its substrate so that the input region lies adjacent to the substrate.

U.S. Pat. No. 4,445,571 (Divens et al) discloses a metal coated tapered optical fiber which is coupled to a substrate and a method of fabrication. A metal layer is formed on the tapered portion of the cladding to prevent light from escaping from the optical fiber. The fiber and the I/O chip are joined together by means of an optical grade epoxy. The fiber is inserted into the I/O chip by means of a conical taper on the tip of the fiber and a corresponding conical cavity in the I/O chip itself.

U.S. Pat. No. 4,474,429 (Yoldas et al) shows the use of another tapered fiber and I/O chip where the junction is subjected to a temperature cycle which fuses glass constituents used to coat the junction of the optical fiber and the I/O chip.

In an article entitled "Fiber Connectors, Splicers and Couplers," by C. Kae, and G. Bickel of ITT Electro-Optical Products Division, Roanoke, Va., there is disclosed in the use of grooved substrate surfaces used to align the junction of two optical fibers.

In an article entitled "Fiber-to-Waveguide Coupling Using Ion-Milled Grooves in Lithium Niobate at 1.3-um Wavelength", by A. C. G. Nutt et al, published in *Optics Letters*, Vol. No. 9, Nov. 10, 1984, there is disclosed a method for connecting a fiber to a waveguide wherein a groove is cut in the waveguide and waveguide substrate. This article teaches that butt coupling the relative positions of the fiber and waveguide while paying attention to matching of fields is an unstable arrangement and is unsuitable for multiport devices. The article further teaches that there is a problem of alignment of silicone V grooves to the lithium niobate substrate because of the difference in coefficients of thermal expansion which may give rise to instabilities. Although a good approach, this attempt had several shortcomings. First, the ion milling of the grooves in the waveguide and the etching of the optical fibers is a slow, expensive and time-consuming process requiring great precision which allows for potential alignment problems between the waveguide and the optical fiber. Second, The etching of the fibers greatly reduces the polarization maintenance properties (i.e., stress zones) of the optical fibers which may exclude the use of birefringent optical fibers. Third, this approach was never actually demonstrated over a wide temperature range or for low loss connections.

Another attempt at providing a temperature-stable coupling device was the use of silicon V-grooves. Optical fibers were prepared by epoxying single-mode fibers into V-grooves etched onto a silicon chip. A silicon chip cover was then mated with the silicon chip containing the etched V-grooves so that the optical fiber cores were precisely and periodically spaced along a straight line. After this assembly of the silicon chip, the end faces of the optical fibers were polished, butt coupled to a corresponding lithium niobate waveguide, aligned and then attached using an optical adhesive. See E. J. Murphy et al, J. of Lightwave Tec., Vol. LT-3, No. 4, pp. 795–798 (August, 1985). Although this approach allows multiple optical fiber mountings to the waveguide, it also has problems, First, the silicon V-groove chip requires very great accuracy and precision in the etching of the V-grooves in order to allow for the correct alignment of the optical fiber cores to the waveguide core. Second, the silicon V-groove approach can only effectively use single mode optical fiber with a 1300 nanometer wavelength or the 850 nanometer wavelength with reduced performance. This approach has never been demonstrated using either polarization maintaining optical fibers or optical fibers at the 850 nanometer wavelength. Third, the silicon V-groove chip is relatively large in physical size. The silicon V-grooved chip and the integrated optical device have different thermal expansion properties. Hence, at the silicon-lithium niobate interface, a substantial thermal mismatch exists which can result in thermal instabilities which could destroy the bond between optical fiber and the waveguide. Finally, silicon V-grooves require excellent fiber core/clad concentricity.

Disclosure Of The Invention

In a copending application, U.S. Ser. No. 07/103,325, a fiber carrier is disclosed as being made of a material which has a coefficient of thermal expansion in the plane of the carrier mounting surface which is substantially equal to the coefficient of expansion of that of the mounting surface of the I/O chip. In that application, it is also disclosed that the fiber carrier may be of the same material as the I/O chip. The I/O chip and the fiber optic carrier are attached to each other by the use of epoxy resin.

In this invention, we provide for a metallic bond between the I/O chip and a fiber optic carrier. By means of a metallic bond, a bond much stronger than that obtainable by use of epoxy resins and other adhesives is obtained.

We also provide for a metallic bond between the fiber optic carrier and the optical fiber.

It is an object of this invention to provide an effective coupling device between lithium niobate devices and optical fibers for operation over a temperature range between −40° C. to +80° C. or greater.

Another object of this invention is to provide an effective coupling device between lithium niobate devices and optical fibers which is more resistant to shock and vibration.

In this invention, the fiber carrier, when welded to the integrated optical device, provides an effective coupling between the optical fiber and the light port in a mounting surface of the I/O chip.

Ideally, both the fiber carrier and the integrated optical device should have a similar or identical anisotropic thermal expansion property along the same known optic axis. Both the fiber carrier and the integrated optical device isotropic thermal expansion properties (typically isotropic in any given plane perpendicular to the anisotropic axis) should also be substantially similar in magnitude to each other.

The fiber carrier is positioned with respect the I/O chip so that the carrier anisotropic axis is parallel to the I/O chip anisotropic axis and such that an auxiliary surface of the carrier is parallel to the device mounting surface. (The auxiliary surface need not have any particular or special relationship to the anisotropic axis; for example, if a plane, it need not necessarily be perpendicular to the anisotropic axis. See FIGS. 2A & 3 of U.S. Ser. No. 103,325.) The optical fiber may be bonded to the fiber carrier so that the plane of the optical fiber end surface lies in the plane of the carrier auxiliary surface. The carrier auxiliary surface is finally bonded to the I/O chip mounting surface so that the optical fiber end facing surface is placed in registration with the light port in the I/O chip. According to this invention, the fiber carrier may be constructed of a metal which has the same thermal expansion characteristics as a metal which is used for the substrate of the integrated optical device. In this configuration, it is also desirable to place the I/O chip upside down on its metallic substrate so that the light port will lie adjacent to the metallic substrate which is metallically bonded to the metallic fiber carrier.

In another embodiment of this invention, the fiber carrier may be constructed of the same lithium niobate material as the I/O chip. When this method is chosen, the fiber carrier will be coated with a metal by spraying, vacuum depositing, or any other known method of depositing metal on such a substance. Similarly, the I/O chip is metallized so that it can be subsequently welded to the metallized fiber optic carrier.

Still further, for either embodiment, the optical fiber itself may be metallized in order to provide for a welded cohesive connection between the optical fiber and the fiber optic carrier.

In this invention, the welding of the metallic surfaces may be accomplished by any known means of welding. Typical welding techniques may include a laser welder, a diffusion welder, soldering with another dissimilar metal and electrostatic bonding. In accordance with the present invention, the I/O chip is fabricated of $LiNbO_3$ or $LiTaO_3$ and the substrate material as well as the fiber carrier may also be made of lithium niobate or lithium tantalate if a metallized surface is used for creating the welded bond of the fiber carrier to the substrate.

In the art of interfacing I/O chips with optical fibers, the act of interfacing to an optical fiber is referred to as "pigtailing". Unless adequate and reliable pigtailing is achieved, integrated optical chips will have little utility outside of the laboratory environment. The disclosed technique of welding a fiber carrier to either the I/O chip, or to the substrate for the I/O chip, provides a strong, reliable connection. This connection will be able to survive substantial g forces encountered in harsh environments, as well as the broad temperature range from −40° C. to +80°0 C. and more. The welded junction is much stronger, less likely to creep, and is overall more reliable than a similar junction produced by use of adhesives such as epoxy.

These and other objects, features and advantages of the present invention will become more apparent in light of the following detailed description of a best mode embodiment thereof, as illustrated in the accompanying drawing.

BRIEF DESCRIPTION OF THE DRAWINGS

In FIG. 1 there is shown an assembled device 10, according to the present invention, having an I/O chip 12 mounted on and bonded to a substrate 14 and having a fiber carrier 16 welded to the substrate for carrying an optical fiber 18. The optical fiber 18 is placed in a groove 20 of fiber carrier 16. A welded connection between the fiber carrier 16 and the substrate 14 may be at any convenient location as shown in FIG. 1 with a weld along the junction of carrier 16 and substrate 14. The I/O chip 12 has a light port 22 to which the optical fiber 18 is butted or affixed. The port 22 may be formed by any means known in the art such as ion exchange or titanium diffusion. The I/O chip is a lithium niobate (LiNbO3 rectangular chip, i.e., slab), which is placed face down on the substrate 14. Placement of the I/O device upside down on the substrate allows the light port 22 to rest immediately adjacent to the top of the substrate. This placement prevents any undesirable effects which might otherwise occur if the port were oriented on top of the assembly, due to thermal expansion and movement of the top of the I/O chip with respect to the top of the substrate 14 and the fiber optic cable 18. In the configuration illustrated, if the I/O chip 12 expands, the light port 22 will still remain adjacent to the carrier 18 instead of moving away if it were on top of the I/O chip 12 and the carrier were bonded to the substrate. In this manner the fiber optic carrier 16 may be welded directly to a metallic base 14 without a direct weld to the I/O chip 12.

The optical fiber 18 may also be metallized by any known method in the region where it fits in the groove 20 of fiber carrier 16. The fiber 18 may thus be welded to the carrier 16 in any known manner.

The optical fiber 18 may also be affixed to the groove in fiber carrier 16 by other adhesion techniques such as epoxy resins. If the fiber 18 is epoxied in place, the main load of any acceleration or vibrational forces will still be carried by the weld between fiber carrier 16 and the substrate 14.

Figure 1:
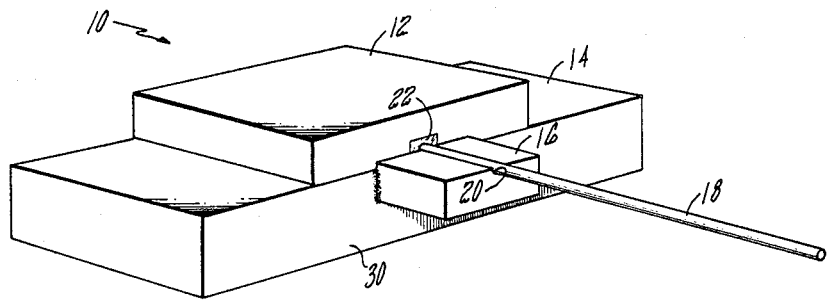
FIG. 1 shows an assembled I/O chip and substrate, a fiber carrier and fiber aligned with a light port.
Figure 2:
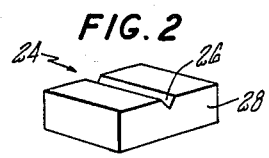
FIG. 2 shows an embodiment of the fiber carrier wherein a V-notch (or other groove) is used to align the fiber optic conductor with the fiber optic carrier and the I/O chip.

In FIG. 2 there is shown another embodiment of a fiber carrier 24 in accordance with this invention. In this embodiment, a V-shaped groove 26 is used to align the fiber optic conductor with the light port of an I/O chip 12 such as in FIG. 1. Shown in FIG. 2 is a partial metallization 28 which is placed upon the end face of fiber carrier 24. In this embodiment, the metallized portion 28 will serve as a link for welding the carrier 24 to a substrate 14.

Fiber carrier 24, like fiber carrier 16, may also be made of metal, in which case it is not necessary to provide further metallization. Ideally, the metal of the substrate 14 should be the same as the metal used in the fiber carrier so that the coefficients of thermal expansion will be the same and hence not create undue stress over a wide temperature range. The metal of the fiber optic carrier 16 and 28 may also be of another metal which has substantially the same coefficient of expansion as does the substrate 14. Still further, the fiber optic carriers 16 and 24 may also be made of a non-metallic material, or even a lithium niobate material. If the substrate 14 and the carrier 16, 24 is to be made of lithium niobate in order to match the coefficient of expansion in the I/O device 12, it will be necessary to provide a metallic coating on both the end face 28 of the carrier as well as an end face 30 of the substrate which carries the I/0 chip.

Figure 3:
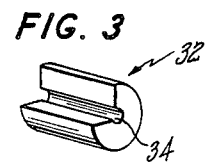
FIG. 3 is another embodiment of the fiber carrier which includes a round hole through a cylindrical shape.

In FIG. 3 there is shown another embodiment of a fiber carrier which may be used with the structure shown in FIG. 1. In FIG. 3 a carrier 32 is constructed from the drawn piece of tubing with a capillary 34 which will receive a fiber such as fiber 18. In this embodiment, again the material may be a metal which is the same as the substrate 14, or may be a metallized material which has a compatible coefficient of expansion with the substrate 14. Again, it maybe welded to the substrate.

Figure 4:
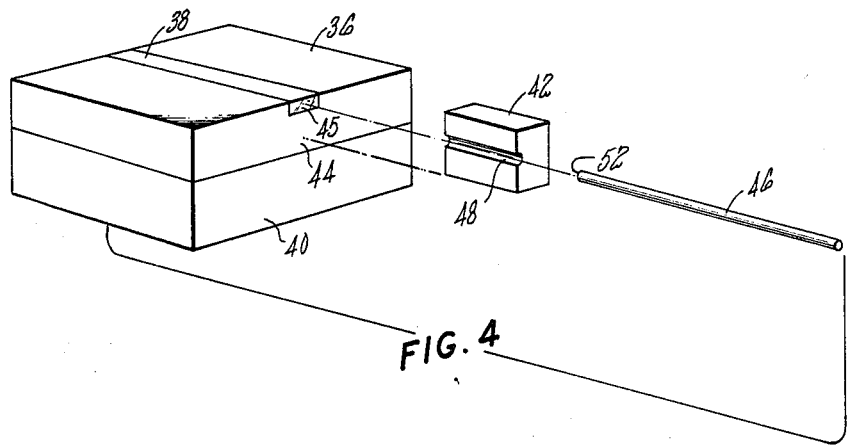
FIG. 4 shows an embodiment of the invention where a fiber optic carrier is to be assembled to the I/O chip and substrate by welding the fiber optic carrier to a face of the I/O chip itself where the chip and carrier are metallized in preparation for welding.

In FIG. 4 there is shown another embodiment of the invention wherein an integrated optical device (I/O chip) 36 has a waveguide 38 oriented with the waveguide on top. The I/O chip 36 is placed upon any suitable substrate 40. In this embodiment a fiber carrier 42 of the general type disclosed is connected directly to the face of the I/O chip 36 rather than to the substrate 40. Therefore, a face 44 which contains a light port 45 will be metallized in order to provide a weldable bond to the fiber carrier 42. Similarly, a facing surface of the fiber carrier 42 is metallized in order to provide a proper bond if carrier 42 is made of a material other than metal. Typically, fiber carrier 42 may be made of the same lithium niobate material as is used for the I/O chip 36 An optical fiber 46 fits into a semi-circular groove 48 of fiber carrier 42. The optical fiber 46 may be metallized in order to provide a metallic bond to carrier 42, or fiber 46 may be set to carrier 42 by means of an adhesion bond such as an epoxy.

Figure 5:
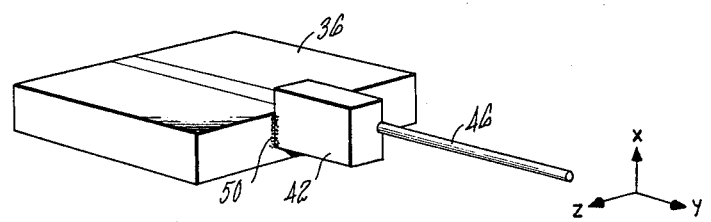
FIG. 5 shows an illustration of a device as in FIG. 4 wherein the weld bond is indicated between the fiber optic carrier and the integrated optical device only. In this embodiment, the fiber carrier is not welded to the I/O chip's substrate, but only to the I/O chip. cl BEST MODE FOR CARRYING OUT THE INVENTION The drawings are not to scale and merely illustrate the present mounting structure with bonding by metallic welding.

In FIG. 5 there is shown a device of FIG. 4 which has been assembled where the fiber carrier 42 is welded to the I/O chip 36 as indicated at junction 50. Again, the weld or metal bonding may occur at any place along the junction of the I/O chip and the fiber carrier 42. Also shown in FIG. 5 is an XYZ coordinate system indicated which shows the degrees of freedom which are possible during assembly of the device During assembly, the optical fiber 46 at its end 52 is placed opposite the light port 45. In order to provide maximum light transfer and throughput between the I/O chip and the optical fiber, the fiber carrier 42 is adjusted in the X and Z directions as shown on FIG. 5 until a maximum light conduction is measured through the system. Note, this is illustrated as a X axis cut with Y axis propagation, although other cuts may be used. The measurement of maximum conduction may be accomplished by merely passing light from fiber optic conductor 46 and into the light waveguide region 38 and moving the carrier about to various positions with respect to the I/O chip. When this is done, the light passing out of the I/O chip can be measured, and a maximum may be detected. When the maximum is detected, the fiber carrier 42 is then welded in position to the face of the I/O device 36.

In the embodiment shown in FIG. 1, the location of the end of the optical fiber 18 with respect to the light port 22 may also be adjusted in the y-direction to provide maximum light conduction through the system in the manner explained with respect to FIG. 5.

In the fiber carriers 16, 24, 32 and 42, there is provided a grooved V-shaped channel or semi-circular channel in which the optical fiber is held. This provides for alignment and positioning of the optical fiber which is parallel to the axis of the light waveguide such as 38.

In the embodiment of FIG. 1 wherein a metallic substrate 14 may be used in combination with a metallic fiber carrier 16 as well as in the embodiment of Figs. 4 and 5 where metallized surfaces may be used, the actual joining of the pieces together may be accomplished by various welding techniques such as laser welding, electrostatic welding, braising, soldering and diffusing welding. Similarly, the bond between the fiber optic carrier and the optical fiber may be of any suitable metal joining technique such as those mentioned with respect to the fiber carrier and the substrate.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

We claim:

1. A method of interfacing an optical fiber to a light port in an integrated optical device (I/O chip), comprising the steps of:
   selecting a material for a fiber carrier which has thermal expansion characteristics which are substantially the same as those of the I/O chip;
   depositing a metallic layer upon the I/O chip and upon said fiber carrier;
   bonding the optical fiber to said fiber carrier;
   placing said fiber carrier next to said I/O chip in a position where the light port is in alignment with the optical fiber; and
   metallically bonding said fiber carrier to the I/O chip at said metallic layers.

2. The method in accordance with claim 1 further comprising the step of:
   depositing said metallic layer by metallizing surfaces of said I/O chip and said fiber carrier.

3. The method in accordance with claim 1 further comprising the steps of:
   placing a metallic layer upon the optical fiber; and
   welding the optical fiber to said fiber carrier.

4. The method in accordance with claim 1 further comprising the step of:
   welding with a laser welder.

5. The method in accordance with claim 1 further comprising the step of:
   welding with a diffusion welding technique.

6. The method in accordance with claim 1 further comprising the step of:
   metallizing with a metal vapor deposit technique.

7. The method in accordance with claim 1 further comprising the step of:
   cutting a notch along one surface of said fiber optic carrier, wherein said notch will lie in a plane which is parallel to the light transmitting axis of the I/O chip.

8. The method of claim 1 wherein the I/O chip and said fiber optic carrier are constructed of the same material and are placed together in a position where the crystal axes thereof are parallel to each other whereby any anisotropic thermal expansion property axes of each are parallel to one another.

9. A method of attaching an optical fiber to a light port in an integrated optical device (I/O chip), comprising in the steps of:
   selecting a metallic material for a fiber carrier;
   bonding the optical fiber to said metallic fiber carrier;
   mounting the I/O chip on a metallic substrate which is made of a metal which has thermal expansion characteristics similar to those of said metallic fiber carrier;
   placing said fiber carrier next to said I/O chip in a position where the light port is in alignment with the optical fiber, and next to said metallic substrate; and
   bonding said fiber carrier to said metallic substrate where said metallic carrier is next to said metallic substrate.

10. The method in accordance with claim 9 wherein said step of mounting comprises the step of mounting said I/O chip upside down on said substrate whereby the light conducting surface of the I/O chip lies adjacent to said substrate.

11. The method in accordance with claim 9 further comprising the steps of:
    placing a metallic layer upon the optical fiber; and
    welding the optical fiber to said metallic fiber carrier.

12. The method in accordance with claim 9 further comprising the step of:
    soldering said metallic fiber carrier to said metallic substrate.

13. The method in accordance with claim 9 wherein said step of bonding further comprises the step of:
    bonding with a laser welder.

14. The method in accordance with claim 9 wherein said step of bonding further comprises the step of:
    bonding with a diffusion welding technique.

15. The method in accordance with claim 9 further comprising the step of:
    cutting a notch along one surface of said fiber optic carrier, wherein said notch will lie in a plane which is parallel to the light transmitting axis of said I/O chip.

16. The method in accordance with claim 9 wherein the optical fiber is aligned with the I/O chip's light port by:
    placing the optical fiber next to the light port; and
    aligning the optical fiber with the optical port by passing light through the fiber and port and adjusting their positions until the maximum light passes though them.

17. The method in accordance with claim 9 wherein the optical fiber is aligned with the I/O chip's light port by:
    placing the optical fiber next to the optical port; and
    rotating said fiber optic carrier and light conductor with respect to the optical port until alignment of the respective optical axes is detected.

18. The method in accordance with claim 1 wherein the optical fiber is a single mode fiber.

19. The method in accordance with claim 18 where the fiber core has a diameter which is less than 5 microns 20. The method in accordance with claim 10 wherein said bonding is by electrostatic bonding.

21. A pigtailed integrated optical (I/O) chip comprising in combination:
   an I/O chip;
   a metallic substrate for holding said I/O chip;
   an optical fiber;
   a metallic fiber optic carrier, to which said optical fiber is attached; and
   a metallic bond between said metallic substrate and said metallic fiber optic carrier.

22. The pigtailed integrated optical chip of claim 21 wherein said metallic fiber optic carrier is made of the same metal as said metallic substrate for holding said I/O chip.

23. The pigtailed integrated optical chip of claim 21 wherein said metallic bond is selected from the group of soldering, electric welding, laser welding, flame welding and diffusion welding.

24. The pigtailed integrated optical chip of claim 21 wherein said I/O chip is mounted upside down on said metallic substrate whereby a light conducting surface of said I/O chip is adjacent said metallic substrate.

25. A pigtailed integrated optical (I/O) chip comprising in combination:
   an I/O chip having a light port and at least one surface a portion of which is metallized;
   a fiber optic carrier having at least one surface a portion of which is metallized;
   an optical fiber which is aligned with said light port and attached to said fiber optic carrier; and
   a metallic bond between said metallized I/O chip surface and said metallized fiber optic carrier.

26. The pigtailed integrated optical chip of claim 25 wherein said metallic bond is selected from the group of soldering, electric welding, laser welding, flame welding and diffusion welding.

27. The pigtailed integrated optical chip of claim 25 wherein said optical fiber is metallized and is attached to said fiber optic carrier by a metallic bond.

28. The pigtailed integrated optical chip of claim 25 wherein said metallized substrate is a solid metal.

* * * * *